Figure 1:
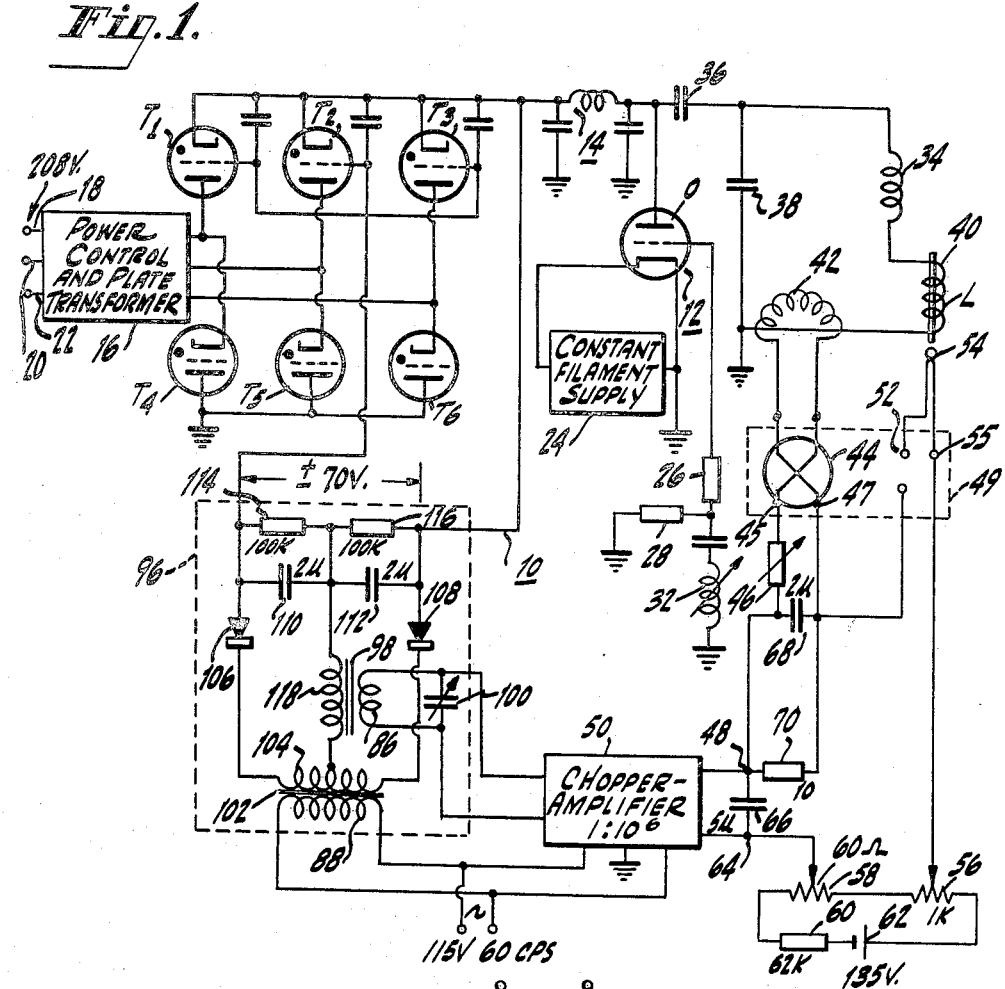

INVENTOR.
ALBRECHT G. FISCHER
BY
Morris L. Rabkin
Attorney 3,177,336
CONTROL APPARATUS FOR INDUCTION HEATING SYSTEM Albrecht G. Fischer, Trenton, N.J., assignor to Radio Corporation of America, a corporation of Delaware
Filed Feb. 5, 1962, Ser. No. 171,075
4 Claims. (Cl. 219—10.77)

This invention relates generally to means to regulate the energy output of an induction heating system, and more particularly to improved control apparatus for maintaining the energy output of an induction heating system substantially constant. The improved control apparatus of the present invention is particularly useful in the art of growing crystals of compound semiconductors, such as zinc selenide, for example, from a melt.

High-frequency heating generators are used for melting materials in the process of growing crystals for semiconductor devices. In many cases, relatively small quantities of compound semiconductors are heated under pressure to their melting points. Because of the relatively small thermal inertia of these small quantities, the temperature of the melt follows fluctuations of the heating energy and/or the ambient temperature very rapidly. Such temperature fluctuations cause an undesirable crystal growth.

It has been proposed to control the induction heating energy by the use of saturable reactor control systems. Because of the large inductance inherent in these reactor systems, however, the regulation provided is generally too sluggish for rapid control. Where a vacuum tube is employed in an oscillator circuit to produce the high-frequency energy output, it has been proposed to control the energy output by feeding back degeneratively amplified signals of samples of the energy output to the grid of the oscillator tube. This control procedure, however, is not feasible in high energy output systems because the feed-back signals would have to be of an amplitude that may either drive the oscillator tube out of oscillation or cause the oscillator tube to draw excessive grid current that would be detrimental to the oscillator tube. Also, the control apparatus for such a system would have to be capable of handling large control currents, necessitating expensive equipment.

It is an object of the present invention to provide improved control apparatus for controlling the energy output of induction heating systems more accurately and rapidly than the aforementioned prior art control means.

Another object of the present invention is to provide improved control apparatus that senses both the current of the output energy and the temperature of an object heated by the output energy of an induction heating system to control adequately the temperature produced by the system for the growing of crystals from relatively small melts.

Still another object of the present invention is to provide improved control apparatus of the type described that is relatively simple in structure, inexpensive to manufacture, and more quickly regulated than prior art control apparatus.

In accordance with the present invention, the improved control apparatus is adapted for use with an oscillator circuit that is energized by a controlled rectifier power supply, such as a thyratron-rectifier power supply. The radio-frequency (R.-F.) energy output from the oscillator circuit is sampled by either a sensing coil or a thermocouple, or by both simultaneously. These samples are converted into direct-current (D.-C.) voltages, compared to a reference voltage, and applied to a D.-C. chopper-amplifier to provide error signals in the form of an amplified, chopped (A.-C.) output. Depending upon the amplitude of the sampled voltages with respect to the reference voltage, the error signals may be in phase or 180° out of phase with the operating A.-C. voltage of the D.-C. chopper amplifier. The error signals are coupled to the input of a phase-sensitive discriminator circuit in a manner whereby they add to or subtract from an A.-C. voltage applied to the phase-sensitive discriminator circuit. The output of the discriminator circuit is applied to the grid of at least one thyratron, if in a polyphase rectifier, to control its time of conduction, whereby to control the energy applied to the oscillator circuit in a corrective manner. In an induction heating system employing a single phase rectifier, wherein the grid of a thryratron is fired through a transformer, the error signals may be coupled to the transformer to control the phase of the firing voltage normally applied to the control grid.

Figure 2:
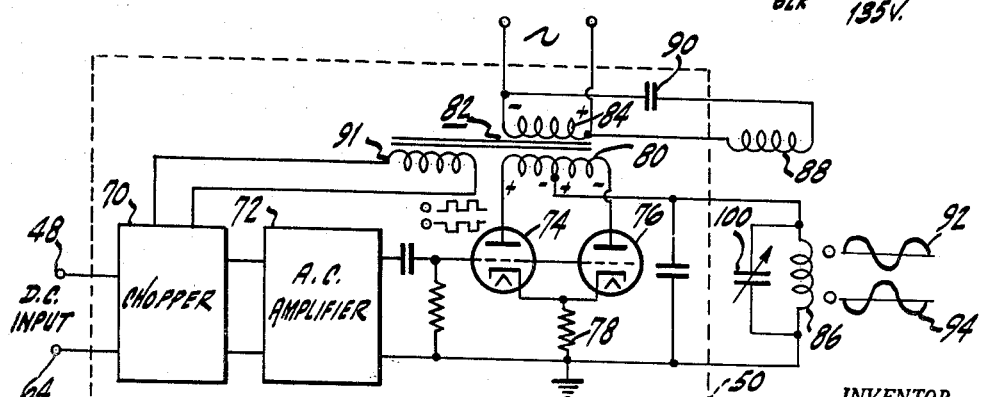

The novel features of the present invention, both as to its organization and method of operation, as well as additional objects and advantages thereof, will be more readily understood from the following description, when read in connection with the accompanying drawing, in which similar reference characters represent similar parts throughout, and in which:

FIG. 1 is a schematic diagram of an induction heating system employing the improved control apparatus of the present invention; and FIG. 2 is a schematic diagram of a suitable D.-C. chopper-amplifier for use in the control apparatus illustrated in FIG. 1.

Referring, now, particularly to FIG. 1, there is shown a controlled induction heating system comprising a power supply circuit 10, an oscillator circuit 12 energized by the power supply circuit 10, and a load coil L energized by the oscillator circuit 12. The power supply circuit 10 comprises six thyratrons T1–T6 connected in a three-phase rectifying circuit. The cathodes of the thyratrons T1, T2, and T3 are connected, through a π-type filter 14, to the anode of an oscillator tube O in the oscillator circuit 12. The anodes of the thyratrons T1, T2, and T3 are connected to the secondary winding (not shown) of a plate transformer which constitutes part of a power control and plate transformer unit 16 of the power supply 10. The anodes of the thyratrons T4, T5, and T6 are connected to each other and to a common connection, such as ground. The cathodes of the thyratrons T4, T5, and T6 are connected to the anodes of the thyratrons T1, T2, and T3, respectively. Three input terminals 18, 20, and 22, connected to the primary winding (not shown) of the plate transformer of the unit 16, are adapted to be connected to any suitable source of three-phase alternating voltage, say 208 volts. The control elements, that is, the control grids of the thyratrons T1, T2, and T3 may be supplied with firing voltages from the unit 16, in a manner well known in the art. These firing voltages may also be controlled manually to adjust the output of the power supply 10. The grids of the thyratrons T4, T5 and T6 are not connected, causing these thyratrons to function as diodes.

The filament cathode of the oscillator tube O is connected to a suitable source 24 of constant voltage and to ground. The grid of the oscillator tube O is connected to ground through serially connected resistors 26 and 28. The junction between the resistors 26 and 28 is connected to ground through a capacitor 30 in series with a variable inductor 32. The inductor 32 is inductively coupled to an inductor 34 to provide feedback from the grid to the anode of the oscillator tube O. One end of the inductor is connected to the anode of the oscillator tube O through a capacitor 36, and the other end of the inductor 34 is connected to ground through the load coil L. A capacitor 38 is connected between the common junction of the capacitor 36 and the inductor 34 and ground.

In operation, three-phase A.-C. voltage, applied to the input terminals 18, 20, and 22 of the unit 16, is stepped up in the unit 16 and is rectified by the thyratrons T1–T6. The rectified output voltage is filtered by the filter 14, which is a part of the power supply 10, and the filtered output voltage is applied between the anode and the filament cathode of the oscillator tube O to energize the oscillator circuit 12. Oscillatory currents in the load coil L cause electrically conductive material 40, such as a small quantity of zinc selenide, to become heated. The amplitude of the unidirectional output voltage of the power supply circuit 10 may be controlled manually from the unit 16 by adjustable grid biasing means (omitted for the sake of clarity of the diagram) for the thyratrons T1, T2, and T3, in a manner well known in the art.

Where the quantity of material 40 to be heated is relatively small, in the order of about a cubic centimeter, for example, variations in the ambient temperature surrounding the load coil L may cause the temperature of the material 40 to vary correspondingly. In certain processes, such as in the art of growing crystals from a melt, such fluctuations in temperature may cause a faulty or undesirable resultant product. In the present apparatus, control apparatus is provided to sample either the current through the load coil L or the temperature produced by the energy output from the load coil L, or both, and to control the power supply circuit 10 in a compensating manner, to thereby maintain the temperature produced by the load coil L substantially constant. To this end, a sensing coil 42 is inductively coupled to the lead between the load coil L and ground to sense changes in the current through the load coil L. The ends of the sensing coil 42 are connected to the input terminals of an RCA 1946 thermocross tube 44. One output terminal 45 of the tube 44 is connected through a variable resistor 46 to one input terminal 48 of a D.-C. chopper-amplifier 50. Another output terminal 47 of the tube 44 is connected to one terminal 52 of a heat sensing thermocouple 54. Another terminal 55 of the thermocouple 54 is connected to the slider of a potentiometer 56. The resistor of the potentiometer 56 is connected in series with the resistor of a potentiometer 58, a resistor 60, and a standard mercury cell 62. The slider of the potentiometer 58 is connected to an input terminal 64 of the chopper-amplifier 50. A filter capacitor 66 is connected between the input terminals 48 and 64 of the chopper-amplifier 50, and a filter capacitor 68 and a resistor 70 are connected in parallel between the output terminal 47 of the thermocross tube 44 and the input terminal 48 of the chopper-amplifier 50.

The thermocross tube 44 comprises a thermocouple encased in an evacuated envelope. The thermocouple comprises two dissimilar wires connected intermediate their ends. Current flowing through the thermocouple heats the junction of the two dissimilar wires and causes a voltage to be produced thereat. This voltage is sensed between the output terminals 45 and 47 of the thermocross tube 44.

The sensing thermocouple 54 may be inserted within the material 40 being heated by the loading coil L where it is desirable to maintain the temperature of the heated material substantially constant. The combined voltages produced by the thermocouple of the tube 44 and the sensing thermocouple 54 can be balanced, that is, cancelled, by adjusting the sliders of the potentiometers 56 and 58. The thermocross tube 44 and the terminals 52 and 55 of the thermocouple 54 may be immersed in an ice bath 49 to maintain reproducible conditions of operation. Also, contact potentials at the terminals of the thermocross tube 44 and the thermocouple 54 remain constant in the ice bath 49. With a desired energy output from the load coil L, the input to the chopper-amplifier 50 should be zero. As will be explained hereinafter, an increase in the energy output from the load coil L causes the chopper-amplifier 50 to produce an error signal that is in phase with an A.-C. operating voltage applied to the chopper-amplifier 50, a decrease in the energy output from the load coil L or a decrease in the temperature of the material 40 being heated by the load coil L, causes the chopper-amplifier 50 to produce an error signal that is 180° out of phase with the aforementioned A.-C. operating voltage.

Referring, now, to FIG. 2, there are shown details of the circuitry of the chopper-amplifier 50. The D.-C. input voltages to the chopper-amplifier 50 are applied to a chopper 70 which may constitute a synchronously driven single pole-double throw switch (not shown). The chopped voltages are stepped up by a transformer (not shown) which may be included in the circuit of the chopper 70. The output of the chopper 70 which may be in the form of square waves are amplified in an A.-C. amplifier 72.

The output of the A.-C. amplifier 72 is capacitively coupled to a power amplifier stage comprising triodes 74 and 76. The cathodes of the triodes 74 and 76 are connected to each other and to ground through a common cathode resistor 78. The anodes of the triodes 74 and 76 are connected to each other through a center-tapped secondary winding 80 of an iron-core transformer 82. The primary winding 84 of the transformer 82 is adapted to be connected to a suitable source of A.-C. voltage, say 115 volts at 60 c.p.s. An output winding 86 is connected between the center tap of the secondary winding 80 and ground. A winding 88 has one end connected directly to one end of the primary winding 84 and another end connected to the other end of the primary winding 84 through a capacitor 90. The output of the A.-C. amplifier 72 is capacitively coupled to each of the grids of the triodes 74 and 76. A tertiary winding 91 of the iron-core transformer 82 is used to operate the chopper 70.

In operation, if the output energy, as sensed by the sensing coil 42 and/or the sensing thermocouple 54, increases, the error signal output from the chopper-amplifier 50 may have the form shown by the waveform 94 (FIG. 2). If, on the other hand, the energy output from the load coil L decreases, the input to the chopper-amplifier 50 also decreases, and the error signal output from the chopper-amplifier 50 may have the form shown by the waveform 92 (FIG. 2). It is noted that the output waveforms 92 and 94, which in effect are the error signals, are 180° out of phase with respect to each other. It will also be noted that, since the anodes of the triodes 74 and 76 are energized alternately by the A.-C. voltage applied to the transformer 82, then one of the waveforms, as, for example, the waveform 92, will be in phase with the A.-C. voltage across the winding 88, and the waveform 94 will be 180° out of phase with the A.-C. voltage of the winding 88.

The chopped and amplified output from the chopper-amplifier 50 is applied to a phase-sensitive discriminator circuit 96, as shown in FIG. 1. The output winding 86 is the primary of an iron-core transformer 98. A variable capacitor 100 is connected across the winding 86 to adjust the output of the chopper-amplifier 50 for a maximum voltage output. The winding 88 is the primary winding of an iron-core transformer 102 (FIG. 1).

A center-tapped secondary winding 104 of the transformer 102 has its ends connected to the cathodes of diodes 106 and 108, respectively. The anodes of the diodes 106 and 108 are connected to each other through serially connected capacitors 110 and 112. The capacitors 110 and 112 are shunted by resistors 114 and 116, respectively. The center tap of the secondary winding 104 is connected to the common junction between the capacitors 110 and 112 through the secondary winding 118 of the transformer 98. The output of the discriminator circuit 96 is applied between the cathodes and the control grids of the thyratrons T1, T2, and T3 to control the time of rectification of the thyratrons. To this end, the anode of the diode 108 is connected to the cathodes of the thyratrons T1, T2, and T3, and the anode of the diode 106 is connected to the control grids of the thyratrons T1, T2, and T3.

In operation, the output from the discriminator circuit 96 is zero in the absence of an error signal output from the chopper-amplifier 50. Thus, in the absence of a voltage across the primary winding 86 the voltage between the serially connected resistors 114 and 116 is zero. When an error signal is applied to the primary winding 86, the voltage induced in the secondary winding 118 adds to one half of the voltage across the center tapped secondary winding 104 and subtracts from the other half of the voltage of the center tapped secondary winding 104, depending on the phase of the error signal with respect to the A.-C. voltage induced in the secondary winding 104. In this manner, the grids of the thyratrons T1, T2, and T3 are controlled in accordance with the phase and the amplitude of the error signals.

The operation of the control apparatus for the induction heating system, in accordance with the present invention, will now be described: Let it be assumed, for example, that the output energy from the load coil L is a desired value. The sliders on the potentiometers 58 and 56 are adjusted so that the voltage between these sliders is cancelled (balanced) by the sum of the voltages across the thermocross tube 44 and across the sensing thermocouple 54. Under these conditions, the D.-C. voltage input between the input terminals 48 and 64 of the chopper-amplifier 50 is zero, and the error signal at the primary winding 86 is zero. The output from the discriminator circuit 96 is also zero, and, therefore, the bias on the grids of the thyratrons T1, T2, and T3 remains unchanged.

Let it now be assumed, that the output energy and/or the heat of the material 40 tend to be increased slightly. Under these conditions, a positive-going D.-C. voltage is presented between the input terminals 48 and 64 of the chopper-amplifier 50. The error signal produced at the output of the chopper-amplifier 50 is a signal having the waveform 94. The voltage induced in the secondary winding 118 by an error signal of the waveform 94 will cause the rectified voltage at the anode of the diode 106 to go negative with respect to the voltage at the anode at the diode 108. Consequently, the voltage at the grid of the thyratrons T1, T2, and T3 will go negative and cause these thyratrons to conduct later than previously. This action decreases the output voltage of the power supply circuit 10. By decreasing the voltage across the oscillator tube O, the energy output from the load coil L is decreased, thereby compensating for the tendency of the energy output to increase.

Let it be assumed, further, that the energy output from the load coil L tends to decrease. The decreased voltages resulting from the sensing coil 42 and the sensing thermocouple 54 cause the D.-C. input voltage to the chopper-amplifier 50 to go negative. Under these conditions, the error signal output from the chopper-amplifier 50 may have the waveform shown by the waveform 92 in FIG. 2. With this error signal applied to the discriminator circuit 96, the anode of the diode 106 will become positive with respect to the anode of the diode 108. Such action causes the grids of the thyratrons T1, T2, and T3 to go positive, thereby advancing the rectification by the thyratrons T1, T2, and T3 and causing the output voltage from the power supply circuit 10 to increase. The increased energy supplied to the oscillator tube O causes the output energy from the load coil L to be increased, thereby compensating for the tendency of the output energy from the load coil L to decrease.

Either the sensing coil 42 or the sensing thermocouple 54 may be used alone, if desired. Thus, the sensing coil 42 may be used alone by connecting the terminals 52 and 55 together, shorting out the sensing thermocouple 54. When it is desired to use the sensing thermocouple 54 alone, the sensing coil 42 is shorted out by connecting its terminals 45 and 47 together.

In an induction heating system of the type shown in FIG. 1, it has been possible to regulate the temperature of small quantities of zinc selenide within less than 1° C. at 1500° C. in 1/30 second.

From the foregoing description, it will be apparent that there has been provided improved control apparatus for controlling the output energy of an induction heating system. While the control apparatus has been shown in diagrammatic form, various components useful therein, as well as variations in the system itself, coming within the spirit of this invention, will, no doubt, readily suggest themselves to those skilled in the art. For example, while the control apparatus of the present invention has been described in connection with a three-phase thyratron rectifier power supply, it will be understood that the control apparatus of the present invention may also be used in combination with heating systems employing controlled rectifiers of the silicon controlled rectifier types in either single phase or polyphase rectifier circuits. Hence, it is desired that the foregoing shall be considered merely as illustrative and not in a limiting sense.

What is claimed is:

1. In combination:
   (a) a power supply comprising at least one controlled rectifier for converting an A.-C. input voltage into a D.-C. output voltage,
   (b) an oscillator circuit having an output circuit including a load coil for converting electrical energy therein to heat energy for a load,
   (c) means to apply said output voltage to said oscillator circuit to energize it,
   (d) means to sample both said electrical and heat energy and to convert said sampled energy into a sample voltage,
   (e) a source of reference voltage, means to compare said sample voltage with said reference voltage to obtain an error signal,
   (f) a chopper amplifier adapted to be energized by an A.-C. voltage, means to apply said error signal to the input of said chopper amplifier to obtain at its output an amplified chopped error signal,
   (g) a phase discriminator circuit having an A.-C. input and a D.-C. output,
   (h) means to apply said amplified chopped error signal to said input of said discriminator circuit, and
   (i) to apply said D.-C. output of said discriminator circuit to said control element to control the time of rectification of said controlled rectifier in a compensatory manner with variations in said energy output, said chopped error signal having a phase with respect to said A.-C. voltage depending upon the amplitude of said sampled voltage with respect to said reference voltage.

2. In an induction heating system of the type wherein an oscillator circuit is energized by the D.-C. output voltage of a power supply employing six thyratrons in a full wave rectifier circuit to rectify a three-phase A.-C. input voltage and to provide said D.-C. output voltage, and wherein the output from said oscillator circuit comprises a load coil whose oscillatory output energy produces heat in electrically conductive objects, the combination therewith of control apparatus comprising:
   (a) means to sample both said output energy and the heat of said object,
   (b) means connected to said sampling means to convert said sampled energy and heat into a D.-C. sample voltage,
   (c) means to compare said sample voltage with a reference voltage to obtain an error signal,
   (d) a chopper-amplifier adapted to be energized by an A.-C. voltage and having an input and an output, (e) means to apply said error signal to said input of said chopper-amplifier, said output of said chopper-amplifier being an amplified chopped error signal of a predetermined phase with respect to said A.-C. voltage, said phase of said error signal being a function of the amplitude of said sample voltage with respect to said reference voltage, (f) a discriminator circuit having an A.-C. input and a D.-C. output, (g) means to apply said output of said chopper-amplifier to said input of said discriminator circuit, and (h) means to apply said D.-C. output of said discriminator circuit to at least three of said thyratrons to control their time of rectification in a compensatory manner with variations in the energy output from said load coil and variations in said heat.

3. In an induction heating system of the type wherein an oscillator circuit is energized by the D.-C. output voltage of a power supply employing six thyratrons in a full wave rectifier circuit to rectify a three-phase A.-C. input voltage and to provide said D.-C. output voltage, and wherein said output from said oscillator circuit comprises a load coil whose oscillatory output energy produces heat in electrically conductive objects, the combination therewith of control apparatus comprising:

(a) means to sample both said output energy and the heat of said objects, (b) means connected to said sampling means to convert said sampled energy and heat into a D.-C. sample voltage, (c) means to compare said sample voltage with a reference voltage to obtain an error signal, (d) a chopper-amplifier adapted to be energized by a single phase A.-C. voltage and having an input and an output, (e) means to apply said error signal to said input of said chopper-amplifier, said output of said chopper-amplifier being an amplified chopped error signal of a predetermined phase with respect to said single phase A.-C. voltage, said phase of said error signal being a function of the amplitude of said sample voltage with respect to said reference voltage, (f) a discriminator circuit energized by said single phase A.-C. voltage and having an A.-C. input and a D.-C. output, (g) means to apply said output of said chopper-amplifier to said input of said discriminator circuit so that said amplified chopped error signal coacts with said single phase A.-C. voltage, and (h) means to apply said D.-C. output of said discriminator circuit to at least three of said thyratrons to control their time of rectification in a compensatory manner with variations in the energy output from said load coil and variations in said heat.

4. In an induction heating system of the type wherein an oscillator circuit is energized by a power supply employing at least one controlled rectifier having a control element, wherein said oscillator circuit produces heat energy for a load, and wherein said heat energy and the electrical energy output of said oscillator circuit tend to vary, the combination therewith of control apparatus comprising (a) means coupled to said oscillator circuit for deriving a first D.-C. signal responsive to the amplitude of said electrical energy output of said oscillator circuit, (b) means adjacent to said load for deriving a second D.-C. signal responsive to the amplitude of said heat energy, (c) means combining said first and second D.-C. signals to obtain a third D.-C. signal, (d) means responsive to said third D.-C. signal for deriving an A.-C. error signal having a magnitude and phase dependent on the amplitude and directions of the variations in said heat and electrical energy, (e) means including a discriminator circuit responsive to the magnitude and phase of said error signal for developing a D.-C. control signal having a polarity and magnitude depending on the magnitude and phase of said error signal, and (f) means to apply said D.-C. control signal to said control element of said control rectifier to control its time of rectification in a compensatory manner with variations in said heat and electrical energy output.

References Cited by the Examiner

UNITED STATES PATENTS

| | | | |
|---|---|---|---|
| 2,647,983 | 8/53 | Boyd | 219—10.77 |
| 2,916,688 | 12/59 | Weir | 323—66 X |
| 3,076,134 | 1/63 | Bennett et al. | 323—66 X |

RICHARD M. WOOD, *Primary Examiner.*